US008352957B2

(12) United States Patent
Ishijima

(10) Patent No.: US 8,352,957 B2
(45) Date of Patent: Jan. 8, 2013

(54) APPARATUS AND METHOD FOR PASSING METADATA IN STREAMS MODULES

(75) Inventor: Yoshihiro Ishijima, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1015 days.

(21) Appl. No.: 12/012,301

(22) Filed: Jan. 31, 2008

(65) Prior Publication Data

US 2009/0198826 A1    Aug. 6, 2009

(51) Int. Cl.
  G06F 3/00    (2006.01)
  G06F 9/44    (2006.01)
  G06F 9/46    (2006.01)
  G06F 13/00   (2006.01)
(52) U.S. Cl. ...................................... 719/313
(58) Field of Classification Search .................. 719/313
  See application file for complete search history.

(56) References Cited

U.S. PATENT DOCUMENTS 5,265,239 A * 11/1993 Ardolino ....................... 709/217
5,815,707 A    9/1998 Krause et al.
6,070,198 A    5/2000 Krause et al.
6,098,112 A    8/2000 Ishijima
6,615,199 B1 * 9/2003 Bowman-Amuah ............ 706/50
6,691,175 B1 * 2/2004 Lodrige et al. ................ 719/314
2003/0217130 A1   11/2003 Tang et al.
2003/0231659 A1   12/2003 DiMambro et al.
2005/0240993 A1   10/2005 Treadwell et al.

OTHER PUBLICATIONS

Stevens et al., "Advanced Programming in the Unix Environment: Second Edition", Jun. 17, 2005, Addison-Wesley, pp. 1-20 and 364-406.*
"STREAM/UX for HP 9000 Reference Manual" [webpages] [online]. Retrieved on Jan. 21, 2008. Retrieved from the internet: http://h20392.www2.hp.com/portal/swdepot/displayProductInfo. do?productNum . . . Total pp. 2.
"Unix® System V Network Programming" by S. Rago. [webpages][online]. Retrieved on Jan. 21, 2008. Retrieved from internet: http://www.pearsonhighered.com/educator/academic/product/0,3110,0201563185,00.html. Total pp. 4.

* cited by examiner

*Primary Examiner* — Emerson Puente
*Assistant Examiner* — Kimbleann Verdi

(57) ABSTRACT

An embodiment of the invention provides an apparatus and method for passing metadata in STREAMS modules. The apparatus and method are configured to perform acts including, allocating a STREAMS message in a kernel space, storing data in the data block in the STREAMS message, allocating a buffer space for metadata associated with the data, storing the metadata of the data in the metadata block in the STREAMS message, passing the metadata among STREAMS modules as a part of the STREAMS message, and performing an operation based upon the metadata.

23 Claims, 3 Drawing Sheets

APPARATUS AND METHOD FOR PASSING METADATA IN STREAMS MODULES

TECHNICAL FIELD

Embodiments of the invention relate generally to an apparatus and method for passing metadata in STREAMS modules.

BACKGROUND

The STREAMS framework (i.e., "STREAMS") has become an industry de facto framework for implementing data communication network protocols, as well as various types of device drivers. The STREAMS provides a bidirectional data path between a user level process, such as an application program, and a device driver in the kernel. A typical STREAMS data path (i.e., "stream" or "STREAMS stack") includes three main types of processing elements: a stream head, optional processing modules, and the device driver. A "STREAMS stack" is a stack of those processing elements (i.e., a stack of STREAMS modules).

The device driver is typically found at the end, or bottom of the STREAMS stack. Drivers can be added to the kernel by linking their object files with the kernel object files. The STREAMS framework includes a set of routines that provide an interface between the user process level (known as "user space") and the kernel level (known as "kernel space"), and it also includes a set of routines that provide an interface between kernel modules (i.e., "STREAMS modules").

A stack of STREAMS modules (i.e. STREAMS stack) provides a bidirectional data path between a process at the user space and a device driver in the kernel space. Data written by a user process travels downstream toward the device driver, and data received by the device driver from the hardware space travels upstream to be retrieved by the user process.

The fundamental building block in STREAMS is the queue (i.e., "STREAMS QUEUE"). The queue links one module to the next module, thereby forming a stack of STREAMS modules, as discussed in, for example, commonly-assigned U.S. Pat. No. 5,815,707. Each module in a STREAMS stack contains one pair of queues (i.e., one queue for the read side (upstream) and one queue for the write side (downstream)). The queue serves as a location to store messages as they flow up and down the STREAMS stack, contains status information, and acts as a registry for the routines that are used to process messages. Additional details on the STREAMS framework are also found, for example, in "UNIX SYSTEM V NETWORK PROGRAMMING", by Stephen A. Rago, Addison Wesley Professional Computing Series (1993), and in "STREAMS/UX for HP 9000 Reference Manual" which is available from HEWLETT-PACKARD COMPANY.

However, the current STREAMS framework does not have the capability to pass the metadata of the data that is being passed between modules in the STREAMS stack. The metadata contains the attributes or ancillary information of the data. As an example, in a typical STREAMS stack that implements a TCP/IP communication, the STREAMS stack will have modules that will not use the same data format. Specifically, this TCP/IP STREAMS stack will have upper layers that use the Transport Provider Interface (TPI) data format, and will have lower layers that use Data Link Provider Interface (DLPI) data format. Currently there is no way to pass the metadata independent of data formats. Therefore, the current technology is not able to pass metadata within the STREAMS framework independent of the data format that is used for the data. Therefore, the current technology is subjected to at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
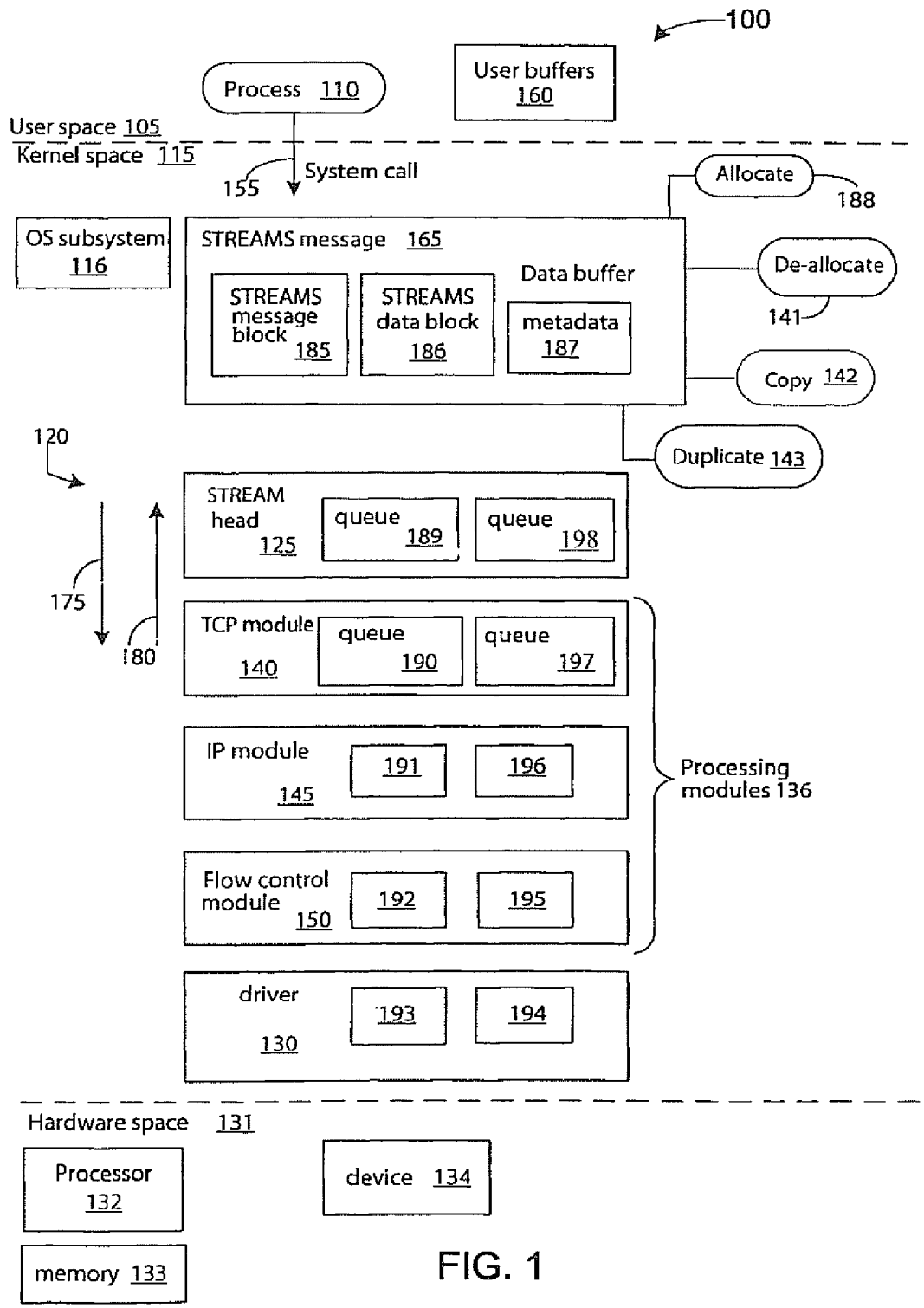
FIG. 1 is a block diagram of an apparatus (system) in accordance with an embodiment of the invention.

FIG. 1 is a block diagram of a system (apparatus) 100 in accordance with an embodiment of the invention. The system 100 is typically a computer system that is in a computing device. A user space 105 will have one or more process 110 which is a running instance of an application software in the user space 105. A kernel space 115 includes various operating system (OS) subsystems 116 that perform various standard operating system functions. A STREAMS stack 120 is also included in the kernel space 115 and will be discussed below in further details. The stack 120 forms the STREAMS modules 120.

A hardware space 131 includes a processor 132 for performing processing functions, memory device 133, and one or more devices 134. Other standard elements in the computer system 100 are not shown in FIG. 1 for purposes of focusing the discussion on features of embodiments of the invention.

The STREAMS stack 120 provides bidirectional communication of messages between the modules. For example, it can provide bidirectional communication of messages between user process 110 and the device 134, as discussed further below. However, it is not limited to the communication between the user process and the device. The STREAMS stack 120 can also provide bidirectional communication of messages between kernel subsystems. A STREAMS stack 120 typically includes a stream head 125 and a device driver 130. The particular implementation of the STREAMS stack 120 will determine the processing modules 136 that are implemented between the stream head 125 and the driver 130. Therefore, the processing modules 136 between the stream head 125 and driver 130 may vary in elements, depending on the implementation of the STREAMS stack. In the example of FIG. 1, the STREAMS stack 120 implements a TCP/IP stack that enables TCP/IP communication. In order to implement a TCP/IP stack, the processing modules 136 would be formed by the following elements: TCP (Transmission Control Protocol) module 140, and IP (Internet Protocol) module 145. In an embodiment of the invention, a control module 150 is also provided to control the flow of a STREAMS message 165, based on the metadata of the data in the STREAMS message, as discussed further below.

Data from user space 105 is processed by the TCP module 140 and IP module 145 in accordance with the TCP/IP protocols. The driver 130 transfers data between the kernel space 115 and devices in the hardware space 131. Note that the driver 130 can interact with hardware devices 134 in the hardware space 131. The driver 130 can also be a software driver (pseudo-device driver) which is not associated with any hardware. As known to those skilled in the art, a software (pseudo-device) driver provides a service to applications such as, for example, emulation of a terminal-like interface between communicating processes.

The STREAMS stack 120 passes data (in the form of STREAMS messages 165) between the stream head 125 and the driver 130. An application process 110 (in user space 105) will send a system call 155 that is received by the operating system in the kernel space 115. The allocate function 188 allocates the STREAMS message 165, and typically copies the data of process 110 from user buffers 160 into the STREAMS message 165. Various methods for allocating buffer space in the kernel space 115 are known to those skilled in the art.

During a system call 155, the operating system packages the data from user buffers 160 as STREAMS messages that travel in the downstream direction 175 toward driver 130. The driver 130 then sends the data to the device 134 in the hardware space 131. The STREAMS messages that travel from the driver 130 to the stream head 125 will transmit in the upstream direction 180.

A STREAMS message is formed by a STREAMS message block 185 and
STREAMS data block 186. For example, when the system call 155 is transmitted by the process 110, the operating system copies user data from user buffers 160 to the STREAMS message 165. This user data is data that is associated with the system call 155. This user data is copied into the STREAMS data block 186. For example, the STREAMS data block 186 may contain the data to be written by process 110 to the device 134 in hardware space 131. The STREAMS message block 185 defines the data block 186 as a STREAMS message that is transmitted in the STREAMS framework. The allocate function 188 will allocate the buffer space for the message block 185 and data block 186 of the STREAMS message 165.

In an embodiment of the invention, when a STREAMS message 165 is created, metadata associated with the data can also be stored. For example, when the system call 155 is transmitted by the process 110, the system call 155 also stores metadata, and these metadata are associated with the user data that is copied from user buffers 160 as data block 186 in the STREAMS message 165. In the case where the data is from the user space, the operating system attaches the metadata to the user data. Note that there is also a case when the data is not from the user space. The system call 155 stores metadata into the STREAMS message 165 as metadata 187. In an embodiment of the invention, the allocate function 188 will also allocate the buffer space for storing the metadata 187 in the STREAMS message 165. Therefore, the STREAMS message 165 will store the message block 185, data block 186 and metadata 187. The allocate function 188 allocates sufficient buffer space for buffering the STREAMS message block 185 and STREAMS data block 186, as well as the metadata 187. Note that the metadata can be stored and passed for messages in either direction: downstream 175 or upstream 180. The usefulness of the STREAMS metadata is not limited to the downstream direction. Further note that the usefulness of the STREAMS metadata is not limited to the communication of the user process data. It can also be used for communication between kernel subsystems within the kernel space. Although it is most intuitive to understand the merit of the metadata when it is used for the user data (and therefore it is used as an example), the metadata can also be attached for the data that is created by a kernel subsystem in the kernel space.

The elements of the metadata 187 are discussed below with reference to FIG. 2.

When a STREAMS message 165 (formed by message block 185, data block 186, and metadata 187) flows in the downstream direction 175, the following sequence occurs. The streams head 125 passes the STREAMS message 165 to the next module in the STREAMS framework 120. In the example of FIG. 1, this next module is the TCP module 140. Therefore, the stream head 125 passes the STREAMS message 165 from queue 189 to the queue 190 of the TCP module 140.

The STREAMS message (the message block 185, data block 186, and metadata 187) then passes to the queue 191, queue 192, and queue 193 that are created for the IP module 145, flow control module 150, and driver 130, respectively. The driver 130 can then transmit the data in the STREAMS message 165 to the device 134 for processing by the device 134. As will be discussed below, an embodiment of the invention allows the flow control module 150 to control or restrict the flow of the STREAMS message 165 based on the metadata 187 of the STREAMS data block 186.

Note that if a STREAM message is flowing in the upstream direction 180, then the STREAMS message (STREAMS message block 185, STREAMS data block 186, and metadata 187) will flow from queue 194 of the driver 130 to queues 195, 196, 197, and 198 that are created for flow control module 150, IP module 145, TCP module 140, and stream head 125, respectively.

Note also that the STREAMS framework also provides other functions such as, for example, the de-allocate function 141 to de-allocate STREAMS messages so that buffers are released and will be available for use by other OS subsystems. The copy function 142 copies the STREAMS message 165 (message block 185, data block 186, and metadata 187) to another STREAMS message. The duplicate function 143 permits two different STREAMS message blocks to share the same STREAM data block 186 and metadata 187. Other functions in the STREAM framework 120 are known to those skilled in the art. Therefore, the STREAMS framework 120 allows the STREAMS modules to pass metadata 187 in parallel with the data 186, from the stream head 125 to the driver 130.

Figure 2:
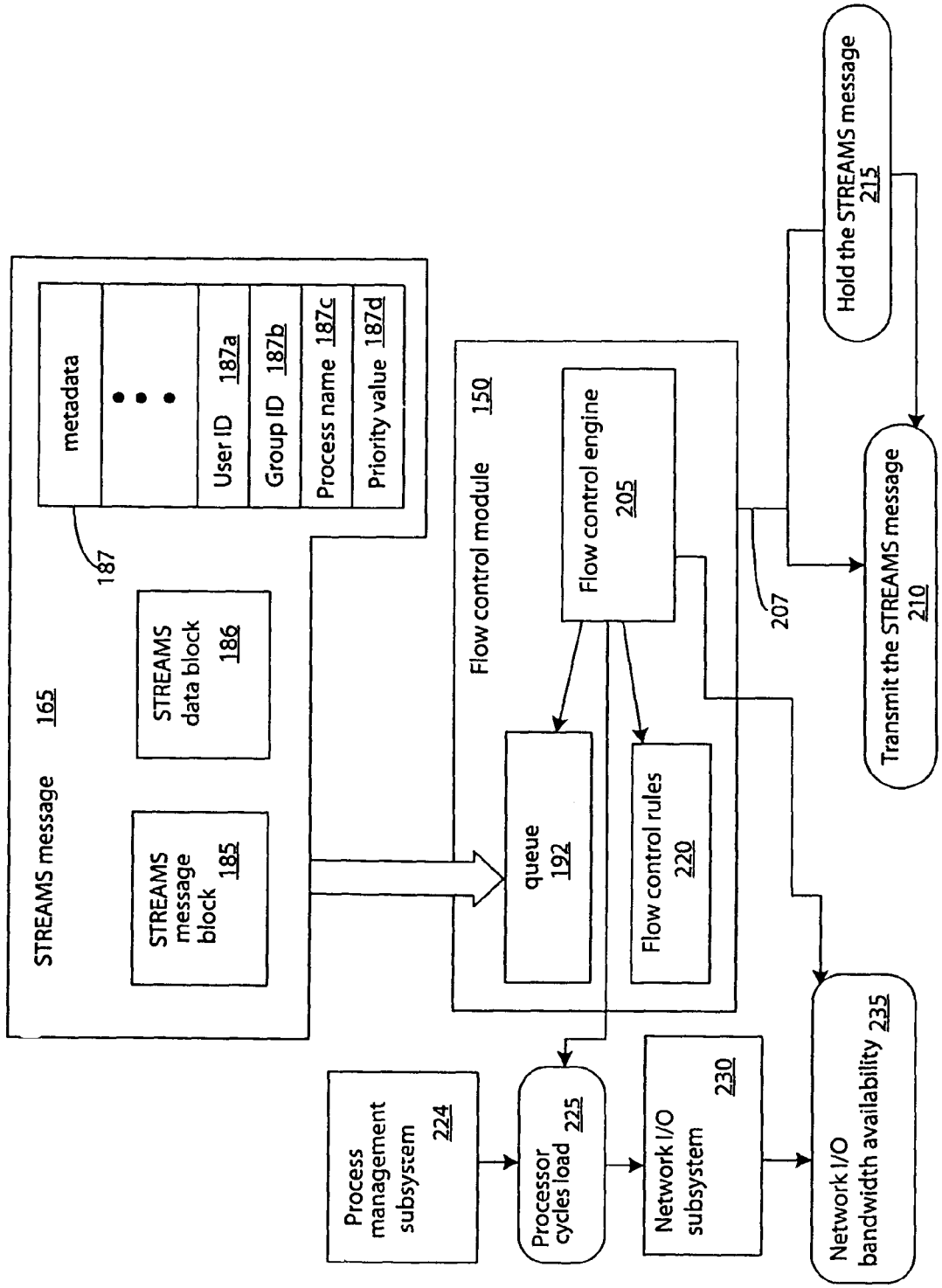
FIG. 2 is a block diagram illustrating additional details of a system in accordance with an embodiment of the invention.

FIG. 2 is a block diagram illustrating additional details of a system in accordance with an embodiment of the invention. The flow control module 150 receives a STREAMS message 165 that includes the STREAMS message block 185, STREAMS data block 186, and metadata 187. The flow control module 150 receives the STREAMS message 165 from an upstream module such as, e.g., IP module 145, or from an downstream module such as, e.g., the driver 130. In other embodiments of the invention where the processing modules 136 are not implemented, the flow control module 150 would receive the STREAMS message 165 directly from the stream head 125.

A flow control engine 205 checks the metadata 187 to determine an operation 207 that will be applied to the message 165. For example, the operation 207 applied to the message 165 can be transmitting 210 the message 165 downstream (or upstream, in another example) without delay. As another example, the operation 207 applied to the message can be holding 215 the message 165 for a given time period (resulting in a transmission delay of the message 165) and then transmitting 210 the message downstream (or upstream, in another example). The amount of time for holding (delaying) the message 165 can be programmed in the flow control rules 220.

For example, if the flow control rules 220 indicate that any STREAMS data block 186 with a priority value 187d of "high" in the metadata 187 is to be immediately transmitted and not be delayed in transmission, then the flow control engine 205 will transmit 210 the message 165 downstream (or upstream, in another example).

As another example, the flow control rules 220 can indicate that any STREAMS data block 186 with a priority value 187d of "low" is to be delayed in transmission. As a result, the flow control engine 205 will hold 215 the STREAMS message 165 and then subsequently transmit 210 the message 165 downstream (or upstream, in another example). The delay 215 in transmission of the message 165 allows differential services (such as Quality of Service (QoS)) to be provided by the kernel space 115 because processor cycles and I/O bandwidth resources will be available to other OS subsystems when the transmission of a STREAMS message 165 is delayed.

As another example, the flow control rules 220 can indicate that any STREAMS data block 186 from particular users will be restricted (by holding 215 the STREAMS message 165 for a given time amount and then subsequently transmitting 210 the message 165 downstream), if the STREAMS message 165 is from a given user that is identified in the flow control rules 220. The metadata 187 (e.g., user ID 187a, group ID 187b, or process name 187c) of a data block 186 will identify whether or not the STREAMS message 165 will be restricted in flow by the flow control engine 205.

As another example, the flow control rules 220 can indicate that any STREAMS data block 186 from particular users will be restricted (by holding 215 the STREAMS message 165 for a given time amount and then subsequently transmitting 210 the message 165 downstream (or upstream, in another example)), if the STREAMS message 165 contains data from a given user that is identified in the flow control rules 220 and if the availability of system resources does not exceed a threshold value that is set in the flow control rules 220. For example, the STREAM message 165 will be held 215 for a given time amount prior to transmission 210 downstream (or upstream, in another example) if the metadata 187 identifies the STREAMS message 165 from a particular user identified in the rules 220 and system resources availability does not exceed a threshold value that is set in rules 220. The system resources could be, for example, processor cycles and/or network I/O bandwidth. The process management subsystem 224 in the kernel space 115 can track the processor cycles load 225 and the network I/O subsystem 230 in the kernel space 115 can track the network I/O bandwidth availability 235.

The flow control engine 205 can compare the metadata 187 information with other parameters specified in the flow control rules 220, or combinations of the above-discussed parameters and other parameters, to determine the operation 207 that will be applied to the STREAMS message 165. Therefore, new types of STREAMS modules (such as, e.g., flow control module 150) can advantageously use the metadata 187 to control the flow of STREAMS messages. For example, the flow control module 150 can be programmed (based on the flow control rules 220) on the type of control, restriction, transmission, or other operation to be performed on STREAMS messages. In an embodiment of the invention, the flow control engine 205 checks the metadata 187 and the flow control rules 220 to determine the particular operation 207 to be applied to the STREAMS message 165. The flow control rules 220 are programmable to various settings.

Note that the operation 207 is not limited to just "flow control" operations. The operation can be any kind of operation that is performed depending on the metadata. Likewise, the control rules 220 is not limited to just "flow control" rules, but can be any type of rules related to an operation that is performed on the message depending on the metadata.

Also note, although the flow control module is illustrated as a separate module as an example, it is not limited to such an implementation. The flow control function can be embedded in other modules such as, e.g., TCP module, IP module, and so on. Further, it does not need to be a single flow control module. Multiple flow control modules can be used, and the multiple flow control modules may cooperate with each other.

Figure 3:
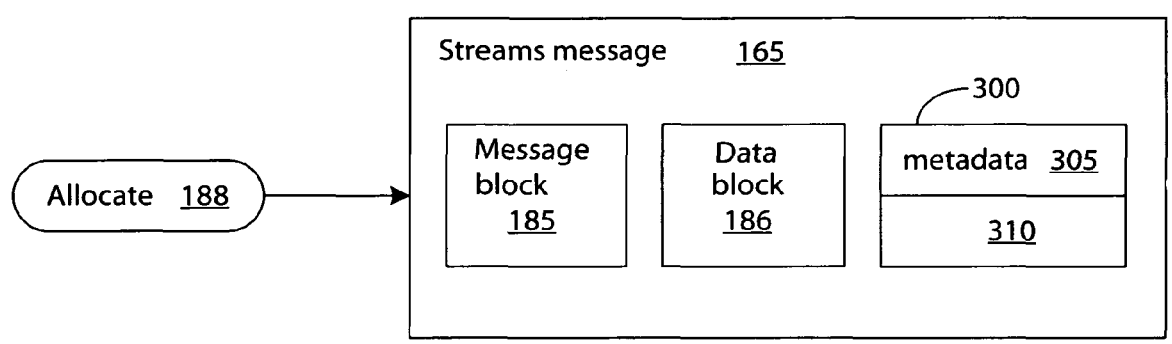
FIG. 3 is a block diagram illustrating a metadata block with an extendable portion, in accordance with an embodiment of the invention.

FIG. 3 is a block diagram illustrating a metadata block 300 with an extendable portion, in accordance with an embodiment of the invention. The block 300 will store the metadata 187 (FIG. 1). The allocate function 188 would allocate a metadata block 300 with a common area 305 and an extension area 310. The allocate function 188 would typically store the commonly-used attributes in the common area 305, such as, for example, user ID 187a, group ID 187b, process name 187c, and/or other attributes of the metadata 187. The extension area 310 can store optional attributes such as, for example, a priority value 187d and/or other optional attributes. The allocate function 188 can allocate the extension area 310 by allocating additional buffer space to the STREAMS message. The amount of allocated additional buffer space can be programmable to various values, so that the extension area 310 can vary in sizes as desired by the programmer.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for passing metadata in STREAMS modules, the method comprising:
    programming an amount of time for delaying a transmission of a STREAMS message in flow control rules;
    allocating the STREAMS message in a kernel space;
    storing data in a data block in the STREAMS message;
    allocating a buffer space for the metadata associated with the data;
    storing the metadata associated with the data in a metadata block in the STREAMS message corresponding to the buffer space for the metadata;
    passing the metadata among the STREAMS modules as a part of the STREAMS message; and
    performing an operation on the STREAMS message based upon the metadata, said operation comprising:
        delaying a transmission of the data based on a particular user and the amount of time programmed for delaying the transmission of the STREAMS message in the flow control rules, wherein the data comprises user data.

2. The method of claim 1, wherein a STREAMS stack comprises the STREAMS modules in the kernel space.

3. The method of claim 1, wherein the metadata block is allocated when the STREAMS message is allocated in the kernel space.

4. The method of claim 1, wherein the metadata is stored in the metadata block that is extendable.

5. The method of claim 1, wherein the data and the associated metadata are passed among the STREAMS modules.

6. The method of claim 1, further comprising:
subsequently transmitting the user data in a downstream or upstream direction.

7. The method of claim 1, wherein the performing the operation on the STREAMS message based upon the metadata further comprises:
transmitting the data based on the metadata, in a downstream or upstream direction.

8. The method of claim 1, wherein the performing the operation on the STREAMS message based upon the metadata further comprises:
delaying the transmission of the user data, based on the metadata and availability of system resources, and
subsequently transmitting the user data in a downstream or upstream direction.

9. The method of claim 1, wherein the performing the operation on the STREAMS message based upon the metadata further comprises:
transmitting the data based on the metadata and availability of system resources, in a downstream or upstream direction.

10. The method of claim 1, wherein the performing the operation on the STREAMS message based upon the metadata further comprises:
performing any operation that is based on the metadata.

11. The method of claim 1, wherein the performing the operation on the STREAMS message based upon the metadata permits a differential service to be performed in the kernel space, based on the metadata.

12. An article of manufacture comprising:
a non-transitory computer-readable medium having stored thereon instructions to:
program an amount of time for delaying a transmission of a STREAMS message in flow control rules;
allocate the STREAMS message in a kernel space;
store data in a data block in the STREAMS message;
allocate a buffer space for metadata associated with the data;
store the metadata associated with the data in a metadata block in the STREAMS message corresponding to the buffer space for the metadata;
pass the metadata among STREAMS modules as a part of the STREAMS message; and
perform an operation on the STREAMS message based upon the metadata, said operation comprising:
a transmission of the data based on a particular user and the amount of time programmed for delaying the transmission of the STREAMS message in the flow control rules, wherein the data comprises user data.

13. The article of manufacture of claim 12, wherein a STREAMS stack comprises the STREAMS modules in the kernel space.

14. The article of manufacture of claim 12, wherein the metadata block is allocated when the STREAMS message is allocated in the kernel space.

15. The article of manufacture of claim 12, wherein the metadata is stored in the metadata block that is extendable.

16. The article of manufacture of claim 12, wherein the data and the associated metadata are passed among the STREAMS modules.

17. The article of manufacture of claim 12, wherein the non-transitory computer readable medium further comprises having stored thereon instructions to:
subsequently transmit the user data in a downstream or upstream direction.

18. The article of manufacture of claim 12, wherein the performing the operation on the the STREAMS message based upon the metadata further comprises:
transmitting the data based on the metadata, in a downstream or upstream direction.

19. The article of manufacture of claim 12, wherein the non-transitory computer readable medium further comprises having stored thereon instructions to:
delay a transmission of the user data, based on the metadata and availability of system resources, and
subsequently transmit the user data in a downstream or upstream direction.

20. The article of manufacture of claim 12, wherein the performing the operation on the STREAMS message based upon the metadata further comprises:
transmitting the data based on the metadata and availability of system resources, in a downstream or upstream direction.

21. The article of manufacture of claim 12, wherein the performing the operation on the STREAMS message based upon the metadata further comprises:
performing any operation that is based on the metadata.

22. The article of manufacture of claim 12, wherein the performing the operation on the STREAMS message based upon the metadata permits a differential service to be performed in the kernel space, based on the metadata.

23. An apparatus for passing metadata in STREAMS modules, the apparatus comprising:
means for programming an amount of time for delaying a transmission of a STREAMS message in flow control rules;
means for allocating the STREAMS message in a kernel space;
means for storing data in a data block in the STREAMS message;
means for allocating a buffer space for the metadata associated with the data;
means for storing the metadata associated with the data in a metadata block in the STREAMS message corresponding to the buffer space for the metadata;
means for passing the metadata among the STREAMS modules as a part of the STREAMS message; and
means for performing an operation on the STREAMS message based upon the metadata, said operation comprising:
delaying a transmission of the data based on a particular user and the amount of time programmed for delaying the transmission of the STREAMS message in the flow control rules, wherein the data comprises user data.

* * * * *

UNITED STATES PATENT AND TRADEMARK OFFICE
CERTIFICATE OF CORRECTION

PATENT NO. : 8,352,957 B2
APPLICATION NO. : 12/012301
DATED : January 8, 2013
INVENTOR(S) : Yoshihiro Ishijima Page 1 of 1

It is certified that error appears in the above-identified patent and that said Letters Patent is hereby corrected as shown below:

In the Claims

In column 7, line 52, in Claim 12, before "a transmission" insert -- delay --.

In column 8, line 12, in Claim 18, delete "the the" and insert -- the --, therefor.

Signed and Sealed this
First Day of October, 2013

Teresa Stanek Rea
*Deputy Director of the United States Patent and Trademark Office*